Dec. 1, 1925.
A. E. OSBORN
INTERNAL COMBUSTION ENGINE
Original Filed Feb. 25, 1920  2 Sheets-Sheet 1
1,563,392
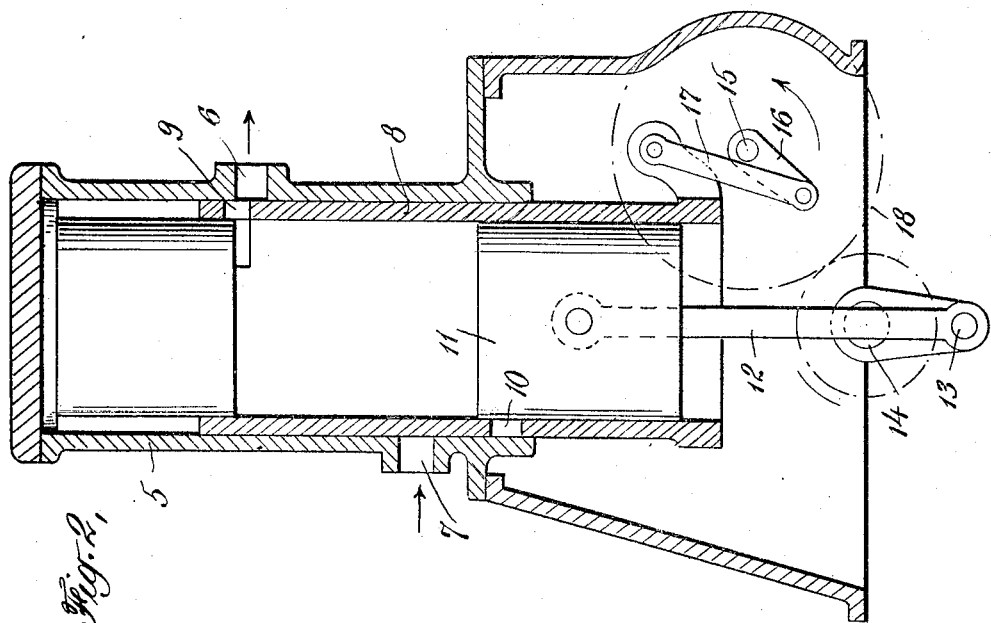
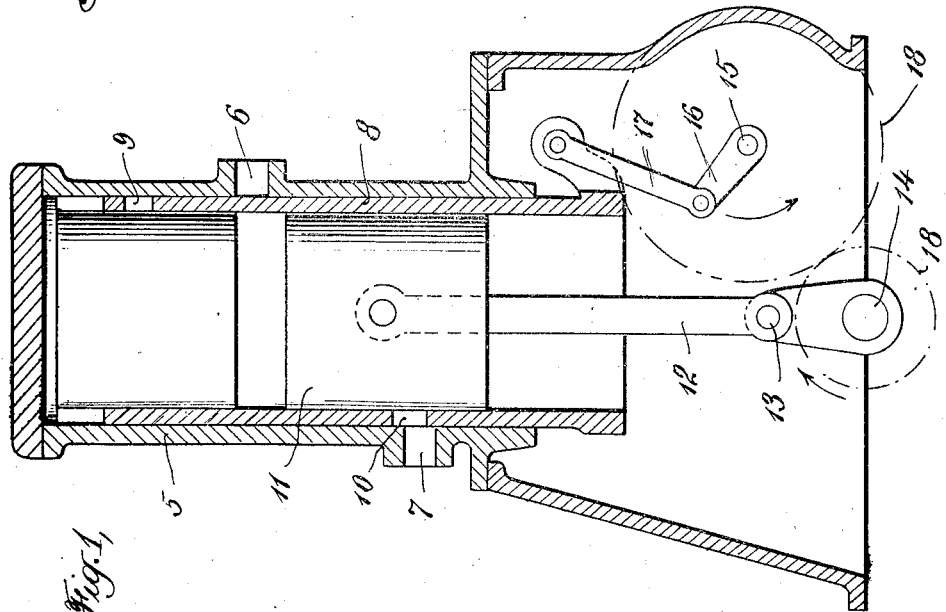
INVENTOR
ALDEN E. OSBORN
BY
ATTORNEY Dec. 1, 1925.
A. E. OSBORN
1,563,392
INTERNAL COMBUSTION ENGINE
Original Filed Feb. 25, 1920 2 Sheets-Sheet 2
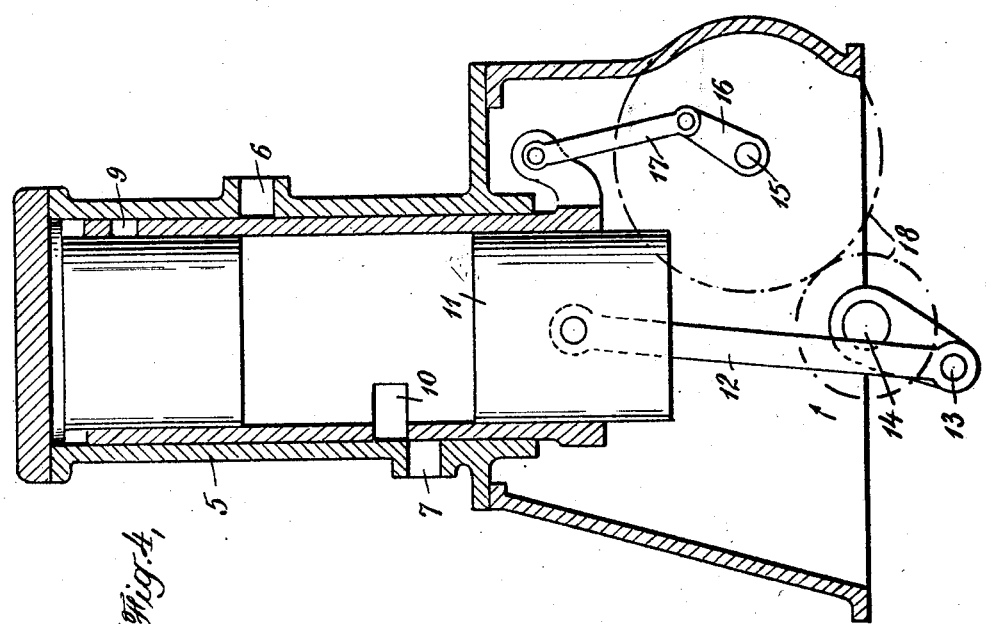
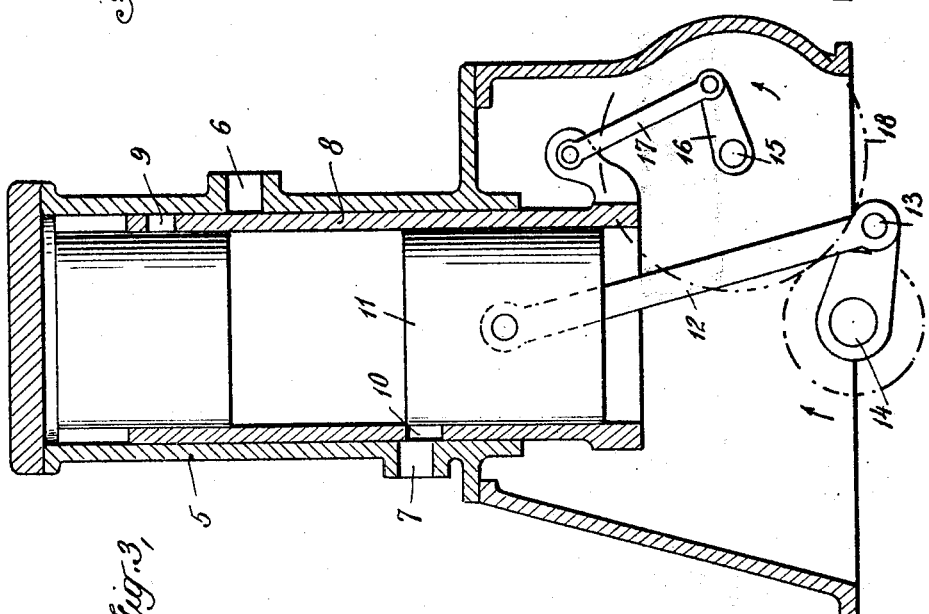
INVENTOR
ALDEN E. OSBORN
BY
C. W. Marshall
ATTORNEY Patented Dec. 1, 1925.

1,563,392

UNITED STATES PATENT OFFICE.

ALDEN E. OSBORN, OF NEW YORK, N. Y.

INTERNAL-COMBUSTION ENGINE.

Application filed February 25, 1920, Serial No. 361,293. Renewed August 12, 1925.

*To all whom it may concern:*

Be it known that I, ALDEN E. OSBORN, a citizen of the United States, and a resident of the city of New York, county and State of New York, have invented certain new and useful Improvements in Internal-Combustion Engines, of which the following is a specification.

This invention relates to engines of the reciprocating sleeve valve type and has for its object to improve the operation of engines of this character.

One of the special features of the invention is the maintainance of the inlet port in the sleeve valve closed by the piston during the entire power and exhaust strokes so as to keep the inlet port free of the gases of combustion by having it below the piston head and the closing of the cylinder intake port by the sleeve valve prior to the closing of the sleeve inlet port by the piston so as to enable the piston to start the compression at an earlier period in its operation.

In the accompanying drawings I have illustrated a practical embodiment of the invention wherein these results are attained, but wish to have it understood that the same is susceptible of various modifications without departure from the true spirit and scope of the invention as defined in the appended claims.

In the drawings referred to, Figure 1 is a sectional view illustrating the parts substantially as they appear at the commencement of the power stroke.

Figure 2 is a similar view of the parts as they appear at the commencement of the exhaust stroke.

Figure 3 illustrates the parts as they appear toward the end of the intake stroke and shows the inlet port in the sleeve about to be uncovered by the piston.

Figure 4 illustrates the parts at commencement of the compression stroke.

The cylinder 5 is shown as of the inverted head type customarily provided in sleeve valve engines, and having near the outer or head portion thereof a suitable exhaust port or ports 6. The exact construction of the upper portion of the cylinder and sleeve valve is not an important part of the present invention and may be modified in many ways, for instance, as disclosed in my Patents Nos. 1,212,391 and 1,279,578. At a point disposed toward the inner end of the piston stroke this cylinder is provided with an intake port or ports 7.

Operating in the cylinder is a sliding sleeve valve 8 controlling at its outer end the exhaust port by means of an exhaust opening or port 9 provided therein and having toward its inner end an inlet port 10 for registry with the intake port 7 in the cylinder.

11 designates the piston operating within the sleeve valve and connected, in this instance, by means of a connecting rod 12 with the crank pin 13 of the crank shaft 14.

The sleeve valve is operated from the "half time" valve shaft 15 by suitable driving means, such as crank 16 and connecting rod 17. The half time shaft is driven from the engine crank shaft by suitable reduction gearing, such as that indicated at 18.

The timing gearing and driving connections are constructed and arranged, as illustrated, to maintain the inlet port 10 in the sleeve covered by the piston during the power and exhaust strokes, Figures 1 and 2, and to cause the sleeve inlet port to advance outward beyond the piston during the intake and compression strokes, as shown in Figures 3 and 4.

Referring particularly to Figure 1 and considering the direction of movement of the parts as indicated by the arrows, it will be seen that during the entire power stroke of the piston the sleeve valve will be traveling outward with the piston and will be covered during all of such period by the piston. At the end of the power stroke the inlet port in the sleeve is still covered by the head portion of the piston, as illustrated in Figure 2, and as the piston starts on the exhaust stroke the sleeve valve is still moving downward so as to bring the exhaust port 9 therein into full registry with the cylinder exhaust port in the course of such exhaust stroke. During both of these periods therefore, when the cylinder is more or less filled with burning gases, the inlet port in the sleeve is covered by the piston and is, therefore, protected from such burning or burned gases, making it impossible for any of the burning gas to "pocket" in the inlet port.

The inlet port in the sleeve is kept covered by the piston also during the greater part of the intake stroke and is only uncovered by the piston toward the end of such stroke, as illustrated in Figure 3. When thus uncovered by the piston, the sleeve is moving upward into a position of full registry with the cylinder intake port, giving full and free clearance for admission of the fresh gas into the cylinder above the piston. The valve continues this upward movement and at about the time the piston starts on its compression stroke, Figure 4, the inlet port in the sleeve passes outward over the intake port in the cylinder, cutting off the intake in advance of the compression stroke of the piston.

In other words, the piston is not relied upon to cut off the intake and therefore no opportunity is given for the piston to force out any of the gas through the intake. The piston thus starts its compression stroke with a full charge of gas in the cylinder and with the intake securely sealed. This results in a high degree of volumetric efficiency and due to the fact that the inlet port is never exposed to the exhaust gases, no dilution of the mixture is possible and the danger of pre-ignition or improper firing is eliminated. In addition, leakage from the cylinder into the cylinder intake passage is prevented by the double sealing provided by the piston where it laps the sleeve port on its inner wall and by the cylinder wall where it laps the sleeve port at the outer side of the sleeve.

What I claim is:

1. In an internal combustion engine, the combination with a cylinder and a piston operating therein, said cylinder having an exhaust port near the inner end of the piston stroke and an intake port near the outer end of the piston stroke, of a reciprocating sleeve valve surrounding the piston and controlling the exhaust port and provided with an inlet port for registry with the intake port and connections from the piston for advancing the sleeve valve to carry the inlet port therein outward beyond the head of the piston during the power and exhaust strokes of the piston and to carry said inlet port inward within the stroke of the head of the piston and over the cylinder intake port between the end of the intake stroke and the commencement of the compression stroke to thereby close the intake port in advance of the closing of the sleeve inlet port by the piston.

2. In an internal combustion engine, the combination of a piston, a cylinder provided with an exhaust port near the inner end of the piston stroke and an intake port disposed near the outer end of the piston stroke, a reciprocatory sleeve valve in said cylinder and between said cylinder and the piston controlling the exhaust port and provided with an inlet port for registry with the cylinder intake port, and driving connections from said piston for operating the sleeve valve to carry the inlet port therein outward past the head of the piston during the entire power and exhaust strokes of the piston and to carry the inlet port inward within the stroke of the head of the piston during the end of the intake stroke and inward beyond the intake port on the commencement of the compression stroke in advance of the piston whereby to maintain said inlet port closed against the products of combustion during the power and exhaust strokes and to cut off the intake port on the compression stroke prior to the covering of the inlet port by the piston.

3. In an internal combustion engine, the combination of a cylinder, a reciprocatory sleeve valve in said cylinder, a reciprocatory power piston within said sleeve valve, a passage through the wall of said cylinder, a port in the sleeve valve and means for moving the sleeve to bring its said port further out of said cylinder than the head of said piston at the end of one of said piston's outward strokes, for moving the sleeve to bring its port within the stroke of said piston head at the end of the next of said piston's outward strokes and for moving the sleeve to bring its port still further into the cylinder and out of register with the said passage through the cylinder wall before the said port is closed by the said piston on the said piston's immediately succeeding inward stroke.

4. In an internal combustion engine, the combination of a cylinder, a reciprocatory sleeve valve in said cylinder, a reciprocatory power piston within said sleeve valve, a passage through the wall of said cylinder, a port in the sleeve valve and means for connecting said piston with said sleeve valve whereby the sleeve is moved to bring its said port further out of said cylinder than the head of said piston at the end of one of said piston's outward strokes, whereby the sleeve is moved to bring its port within the stroke of said piston head and in line with the cylinder passage at the end of the piston's next outward stroke and whereby the sleeve is moved to bring its port still further into the cylinder and out of register with the passage through the cylinder wall before the said port is closed by the said piston on its immediately succeeding inward stroke.

In witness whereof I have hereunto set my hand this 20th day of February, 1920.

A. E. OSBORN.